(12) United States Patent
Wang et al.

(10) Patent No.: US 6,387,467 B1
(45) Date of Patent: May 14, 2002

(54) OPTICAL RECORDING MEDIUM STRUCTURE AND METHOD OF MANUFACTURE

(75) Inventors: Wei-Hsiang Wang, Hisnchu; Min-Hui Huang, Taichung, both of (TW)

(73) Assignee: Ritek Corporation, Hsinchu (TW)

( * ) Notice: Subject to any disclaimer, the term of this patent is extended or adjusted under 35 U.S.C. 154(b) by 24 days.

(21) Appl. No.: 09/695,382

(22) Filed: Oct. 23, 2000

(30) Foreign Application Priority Data

Aug. 18, 2000 (TW) ............................................ 89116721

(51) Int. Cl.[7] ................................................ B32B 3/02
(52) U.S. Cl. .................... 428/64.1; 428/64.5; 428/64.6; 430/270.13
(58) Field of Search ............................... 428/64.1, 64.4, 428/64.5, 64.6, 913; 430/270.13, 495.1, 945; 369/283, 288

(56) References Cited

U.S. PATENT DOCUMENTS 6,261,661 B1 * 7/2001 Ohno ......................... 428/64.1
6,296,915 B1 * 10/2001 Yusu .......................... 428/64.1
2001/0041304 A1 * 11/2001 Uno .......................... 430/270.1

* cited by examiner

Primary Examiner—Elizabeth Evans
(74) Attorney, Agent, or Firm—J.C. Patents

(57) ABSTRACT

An optical recording medium structure and its method of manufacture. The optical recording medium structure includes, from bottom to top, a transparent substrate, a first dielectric layer, a first buffer layer, a recording layer, a second buffer layer, a second dielectric layer, an optical compensation layer and a reflection layer. The optical recording medium structure is manufactured by forming the first dielectric layer, the first buffer layer, the recording layer, the second buffer layer, the second dielectric layer, the optical compensation layer and the reflection layer in sequence over the transparent substrate. The first buffer layer and the second buffer layer serves to prevent the diffusion of at least one element from the recording layer into the first and the second dielectric layer and vice versa. The optical compensation layer enhances thermal sensitivity of the recording layer during an optical read/write operation.

27 Claims, 1 Drawing Sheet

OPTICAL RECORDING MEDIUM STRUCTURE AND METHOD OF MANUFACTURE

CROSS-REFERENCE TO RELATED APPLICATION

This application claims the priority benefit of Taiwan application serial no. 89116721, filed Aug. 18, 2000.

BACKGROUND OF THE INVENTION

1. Field of Invention

The present invention relates to a mass storage medium. More particularly, the present invention relates to an optical recording medium structure and method of manufacture.

2. Description of Related Art

Through the popularization of multimedia, large quantities of textual, sound and image data are generated. One consequence of this is the rapid development of data storage medium, especially in the storage density and access rate of the medium. Due to the advantages including high storage capacity, stability over long period, low production cost, high compatibility and low error rate, compact disk (CD) is one of the major storage medium for multimedia system. Amongst the variety of compact disk types, writable type of optical disks are now widely used. To write data onto a writable disk, a beam of laser is shone onto a recording material to change the optical property of recording material at a particular location. Data value at the location can also be read out through laser beam reflection. For example, phase transition type of writable disk utilizes the difference in amount of reflection of a laser beam between the crystalline state and the non-crystalline state of a recording material to record digital data. Because old data can be erased and new data can be rewritten onto a phase transition type of writable disk concurrently by modulating laser beam power, phase transition type of writable disk is a high-speed recording medium.

FIG. 1 is a schematic cross-sectional view showing a conventional phase transition type of optical disk. As shown in FIG. 1, the phase-transition optical disk 10 consists of a stack of layers. The stack includes, from bottom to top, a substrate 12, a first dielectric layer 14, a recording layer 16, a second dielectric layer 18, a reflection layer 20 and a passivation layer 22. The first dielectric layer 14 and the second dielectric layer 18 is made from a material such as silicon oxide ($SiO_x$) or zinc sulfide-silicon dioxide (ZnS—$SiO_2$). The recording layer 16 is an alloy material that includes germanium (Ge), tellurium (Te) and antimony (Sb).

In general, the stochiometric composition of germanium, tellurium and antimony inside the recording layer 16 is $Ge_2Sb_2Te_5$. However, as wavelength of laser beam used in optical disk read/write is shortened, difference in optical coefficients between a recording material in a non-crystalline state and one in a crystalline state becomes smaller. In other words, difference in optical reflection between the two optical states becomes smaller rendering the differences in digital levels more difficult to decipher. To facilitate digital signal reading, the standard stochiometric composition of $Ge_2Sb_2Te_5$ is ultimately relaxed so that a recording layer having a higher ratio of germanium and tellurium is used.

Although using a recording material with a higher composition of germanium and tellurium is able to increase signal modulation, repeatability of the recording medium will deteriorate due to straying from the standard stochiometric composition. The main reason is that a relatively high temperature is required for rewriting new data. After re-writing a few times, the sulfur atoms and oxygen atoms within the second dielectric layer 18 and the first dielectric layer 14 will diffuse into the recording layer 16. Similarly, germanium, antimony and tellurium atoms within the recording layer 16 will also diffuse into the first and second dielectric layer 14 and 18 respectively.

In addition, the coefficient of absorption between the crystalline region and non-crystalline regions (representing recording marks of digital data) of the recording layer 16 are different. Hence, the recording marks inside the recording layer 16 may be distorted after some re-writing leading to slight jittering of the signal and poorer data read-off. In brief, a lowering of the wavelength of laser beam to increase recording density leads to a recording layer having a composition that deviates from the standard stochiometric composition. Hence, there is a need to find a method capable of preventing the diffusion of atoms between the recording layer and surrounding dielectric layers so that distortion of recording marks can be avoided even after repeated re-writing operations.

SUMMARY OF THE INVENTION

Accordingly, one object of the present invention is to provide an optical recording medium structure capable of slowing signal deterioration due to repeated re-writing operations. The optical recording medium structure includes a transparent substrate, a first dielectric layer over the substrate, a first buffer layer over the first dielectric layer, a recording layer over the first buffer layer, a second buffer layer over the recording layer, a second dielectric layer over the second buffer layer, an optical compensation layer over the second dielectric layer and a reflection layer over the optical compensation layer. The recording medium structure may further include an additional passivation layer over the reflection layer for damage protection.

The invention also provides a method of forming an optical recording structure. A transparent substrate is provided. A first dielectric layer, a first dielectric layer, a first buffer layer, a recording layer, a second buffer layer, a second dielectric layer, an optical compensation layer and a reflection layer are sequentially formed over the substrate. An additional passivation may form over the reflection layer for damage protection.

In the embodiment of this invention, the first (the second) buffer layer serves to prevent the diffusion of atoms of at least one element type in the recording layer into the first (the second) dielectric layer. The first (the second) buffer layer also serves to prevent the diffusion of atoms of at least one element type in the first (the second) dielectric layer into the recording layer. The optical compensation layer serves to enhance thermal sensitivity of the recording layer during an optical read/write operation. In addition, spiraling guide grooves may also form on the transparent substrate for collimating laser beam for more accurate reading. Furthermore, a phase transition material capable of transiting reversibly between a crystalline state and a non-crystalline state may be used to form the recording layer.

In this invention, the recording layer is sandwiched between two buffer layers so that inter-diffusion of atoms between the recording layer and the first (the second) dielectric layer is avoided and a constant composition of the recording layer is maintained. Since a shorter wavelength laser beam must be used to increase storage capacity of optical disk, non-standard stoichiometric composition must be used to form the recording layer. This invention can effectively stop the inter-diffusion of atoms between the recording layer and the first (the second) dielectric layer after repetitive re-writing and hence can prevent the gradual deterioration of the recording medium. In addition, an optical compensation layer is used to enhance thermal sensitivity of the recording layer during an optical read/write operation. Since the light-absorption capacity in the crystalline regions is greater than light-absorbing capacity in the non-crystalline regions, distortion of recording marks is minimized.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
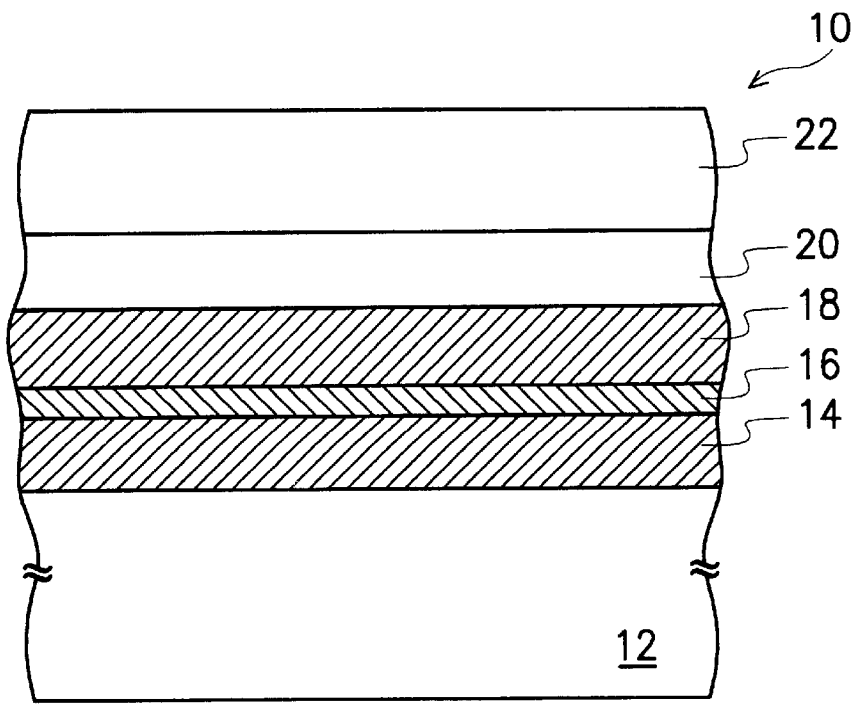
FIG. 1 is a schematic cross-sectional view showing a conventional phase transition type of optical disk.

Reference will now be made in detail to the present preferred embodiments of the invention, examples of which are illustrated in the accompanying drawings. Wherever possible, the same reference numbers are used in the drawings and the description to refer to the same or like parts.

Figure 2:
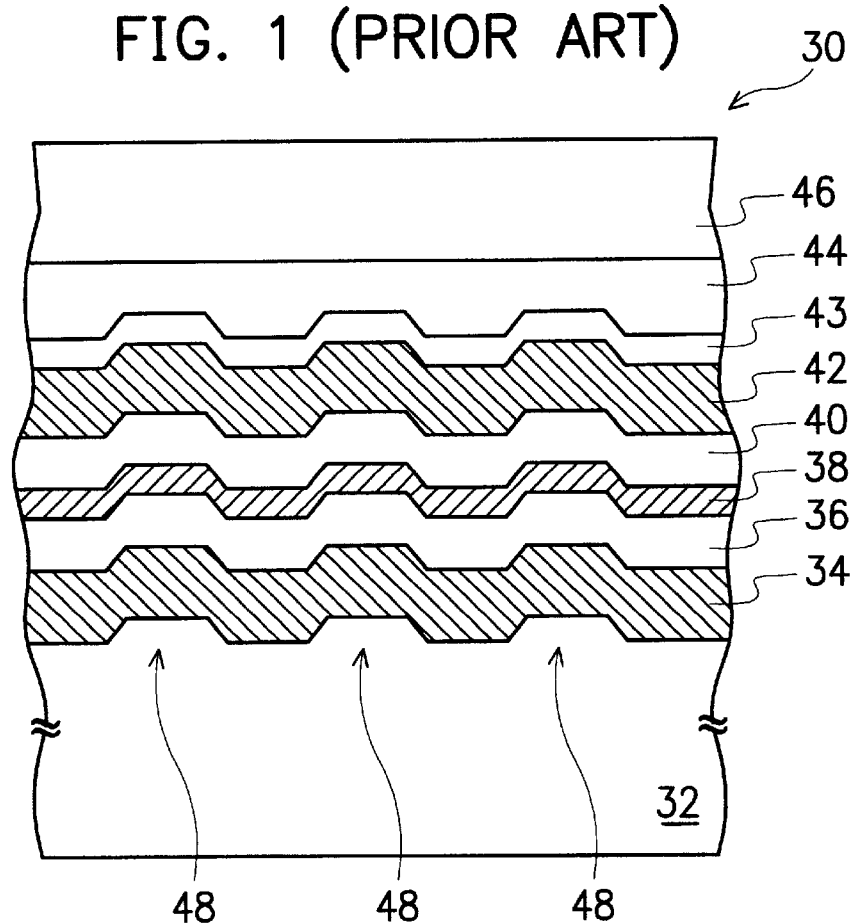
FIG. 2 is a schematic cross-sectional view showing an optical recording medium structure according to one preferred embodiment of this invention.

FIG. 2 is a schematic cross-sectional view showing an optical recording medium structure according to one preferred embodiment of this invention. As shown in FIG. 2, the optical recording medium structure 30 comprises of, from bottom to top, a transparent substrate 32, a first dielectric layer 34, a first buffer layer 36, a recording layer 38, a second buffer layer 40, a second dielectric layer 42, an optical compensation layer 43, a reflection layer 44 and a passivation layer 46. The optical recording medium 30 is formed by providing a transparent substrate 32 and then sequentially depositing a first dielectric layer 34, a first buffer layer 36, a recording layer 38, a second buffer layer 40, a second dielectric layer 42, an optical compensation layer 43, a reflection layer 44, a passivation layer 46 over the substrate 32.

The transparent substrate 32 has a thickness about 0.6 mm, the first dielectric layer has a thickness greater than 40 nm, the first buffer layer 36 has a thickness between about 3 nm to 25 nm, the recording layer has a thickness between about 7 nm to 25 nm, the second buffer layer 40 has a thickness between about 3 nm to 10 nm, the second dielectric layer 42 has a thickness between about 10 nm to 40 nm, the optical compensation layer 43 has a thickness greater than 10 nm and the reflection layer 44 has a thickness greater than 40 nm.

Polycarbonate material may be used to form the transparent substrate 32. Moreover, some guiding grooves 48 (shown in FIG. 2) are formed on the transparent substrate 32 for collimating the laser beam while reading data from the recording medium. The guiding grooves 48 on the substrate 32 forms a spiraling pattern, which can be seen from above, centered upon the middle of the transparent substrate 32. The second dielectric layer 42 and the first dielectric layer 34 can be made from an insulating material such as silicon nitride, silicon oxide, zinc-sulfur or titanium oxide ($TiO_x$). The second dielectric layer 42 and the first dielectric layer 34 are formed, for example, by sputtering or evaporation.

The recording layer 38 is formed from a phase transition material capable of transiting reversibly between a crystalline phase and a non-crystalline phase. The reflection ratio in the crystalline phase is greater than the reflection ratio in the non-crystalline phase. The phase transition material may be an alloy of tellurium, germanium and antimony or an alloy of indium (In), silver (Ag), tellurium, germanium and antimony. The phase transition layer 38 is formed, for example, by sputtering or evaporation.

The optical compensation layer 43 may be an alloy between germanium and a metal. The metal that can be alloyed with the germanium includes aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au). If the alloying metal is chromium, the amount of chromium in the alloy (the mole ratio) should be between 10% to 30%. The optical compensation layer 43 is used for enhancing thermal sensitivity of the recording layer 38 during an optical read/write operation. Ultimately, light-absorbing power in the crystalline regions of the recording layer 38 is much greater than the non-crystalline regions (the recording marks for digital data) of the same recording layer 38. Hence, distortion of recording marks due to repetitive writing can be greatly reduced. The reflection layer 44 can be an aluminum (Al) layer, a copper (Cu) layer, a gold (Au) layer or a platinum (Pt) layer. Moreover, the reflection layer 44 can also be an alloy containing various combinations of above four types of metals.

The second buffer layer 40 and the first buffer layer 36 can be formed by DC sputtering in a gaseous nitrogen atmosphere. The sputtering target can be made from pure germanium (Ge) or an alloy containing both germanium and aluminum (Al). The aluminum-to-germanium ratio is greater than zero but smaller than or equal to 15:85. In addition, the second buffer layer 40 and the first buffer layer 36 can be formed by sputtering in a gaseous nitrogen atmosphere using a target made from an alloy containing germanium and a specified metal. The specified metal includes aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au). If the sputtering target is made from pure germanium and the sputtering is conducted in a nitrogen atmosphere, a material layer composing of nitrogen and germanium is formed. On the other hand, if the sputtering target is made from germanium and another metal and the sputtering is conducted in a nitrogen atmosphere, a material layer composing of nitrogen, germanium and the specified metal is formed. Since the main constituent of the first and the second buffer layers 36 and 40 and the recording layer 38 is the element germanium, the buffer layers and the recording layer form highly compatible junctions with few cracks.

In summary, the optical recording medium structure of this invention has an additional first buffer layer and a second buffer layer between the recording layer. Hence, inter-diffusion of main constituents between the buffer layer and the recording layer is prevented besides blocking the entrance of sulfur and oxygen atoms from the buffer layers into the recording layer. In addition, laser beam having shorter wavelength is nowadays used to increase storage capacity of optical disk. Therefore, non-standard stoichiometric composition has to be used to form the recording layer. This invention can effectively stop the inter-diffusion of atoms between the recording layer and the first (the second) dielectric layer after repetitive re-writing and hence can prevent the gradual deterioration of the recording medium. Furthermore, an optical compensation layer is used to enhance thermal sensitivity of the recording layer during an optical read/write operation. Since the light-absorption capacity in the crystalline regions is greater than light-absorbing capacity in the non-crystalline regions, distortion of recording marks is minimized. Ultimately, jittering of signal is minimized and digital data are more easily deciphered.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical recording medium structure, comprising:
   a transparent substrate;
   a first dielectric layer over the transparent substrate;
   a first buffer layer over the first dielectric layer;
   a recording layer over the first buffer layer, wherein the first buffer layer prevents the diffusion of at least one type of element from the recording layer into the first dielectric layer and at the same time prevents the diffusion of at least one type of element from the first dielectric layer into the recording layer;
   a second buffer layer over the recording layer;
   a second dielectric layer over the second buffer layer, wherein the second buffer layer prevents the diffusion of at least one type of element from the recording layer into the second dielectric layer and at the same time prevents the diffusion of at least one type of element from the second dielectric layer into the recording layer;
   an optical compensation layer over the second dielectric layer; and
   a reflection layer over the second dielectric layer.

2. The structure of claim 1, wherein material constituting the first buffer layer and the second buffer layer includes nitrogen and germanium.

3. The structure of claim 1, wherein material constituting the first buffer layer and the second buffer layer includes nitrogen, germanium and aluminum.

4. The structure of claim 3, wherein amongst the constituents nitrogen, germanium and aluminum, the ratio by weight between the elements aluminum and germanium is greater zero but smaller than or equal to 15:85.

5. The structure of claim 2, wherein material constituting the first buffer layer and the second buffer layer includes nitrogen, germanium and a metal selected from a group consisting of aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au).

6. The structure of claim 1, wherein the transparent substrate further includes some guiding grooves on the surface that form a spiraling shape pattern around the middle of the transparent substrate when viewed from the top.

7. The structure of claim 1, wherein the recording layer is constructed using a phase transition material and the phase transition material is capable of transiting reversibly from a crystalline phase into a non-crystalline phase, and the phase transition material has a higher optical reflection coefficient in the crystalline phase than in the non-crystalline phase.

8. The structure of claim 7, wherein material constituting the phase transition material includes an alloy that contains tellurium (Te), germanium (Ge) and antimony (Sb) or an alloy that contains indium (In), silver (Ag), germanium (Ge) and tellurium (Te).

9. The structure of claim 1, wherein material constituting the first dielectric layer and the second dielectric layer includes silicon nitride, silicon oxide, zinc-sulfur, or titanium oxide.

10. The structure of claim 1, wherein material constituting the optical compensation layer includes an alloy that contains germanium (Ge) and a metal selected from a group consisting of aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au).

11. The structure of claim 10, wherein the amount of chromium (mole ratio in percentage) that alloys with germanium (Ge) is between 10% to 30% if chromium is used as the metal component of the alloy.

12. The structure of claim 1, wherein material constituting the reflection layer includes a metal selected from a group consisting of aluminum (Al), copper (Cu), gold (Au), silver (Ag) or platinum (Pt) or an alloy of the metals selected from the group consisting of the said metallic elements.

13. The structure of claim 1, wherein the reflection further has a passivation layer on top.

14. A method of forming an optical recording medium structure, comprising the steps of:
   providing a transparent substrate;
   forming a first dielectric layer over the transparent substrate;
   forming a first buffer layer over the first dielectric layer by sputtering;
   forming a recording layer over the first buffer layer by sputtering, wherein the first buffer layer prevents the diffusion of at least one type of element from the recording into the first dielectric layer and prevents the diffuison of at least one type of element from the first dielectric layer into the recording layer;
   forming a second buffer layer over the recording layer by sputtering;
   forming a second dielectric layer over the second buffer layer, wherein the second buffer layer prevents the diffusion of at least one type of element from the recording layer into the second dielectric layer and prevents the diffusion of at least one type of element from the second dielectric layer into the recording layer;
   forming an optical compensation layer over the second dielectric layer; and
   forming a reflection layer over the optical compensation layer.

15. The method of claim 14, wherein the step of forming the first buffer layer and the second buffer layer includes sputtering using a pure germanium target in an atmosphere containing gaseous nitrogen.

16. The method of claim 14, wherein the step of forming the first buffer layer and the second buffer layer includes sputtering using a germanium-aluminum alloy target in an atmosphere containing gaseous nitrogen.

17. The method of claim 16, wherein the germanium-aluminum target has an aluminum-to-germanium weight ratio greater than zero but smaller than or equal to 15:85.

18. The method of claim 14, wherein the step of forming the first buffer layer and the second buffer layer includes sputtering using an alloy target in an atmosphere containing gaseous nitrogen, with the alloy containing germanium and a metal selected from a group consisting of aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au).

19. The method of claim 14, wherein the step of forming the first buffer layer and the second buffer layer includes DC sputtering.

20. The method of claim 14, wherein the step of forming the recording layer includes depositing a phase transition material, the phase transition material is capable of transiting reversibly between a crystalline phase and a non-crystalline phase, and the phase transition material has a greater optical reflection coefficient in the crystalline phase than in the non-crystalline phase.

21. The method of claim 20, wherein the phase transition material includes an alloy containing tellurium (Te), germanium (Ge) and antimony (Sb) or an alloy containing indium (In), silver (Ag), antimony (Sb), germanium (Ge) and tellurium (Te).

22. The method of claim 14, wherein the transparent substrate further includes guiding grooves on the surface forming a spiraling pattern around the middle of the transparent substrate when viewed from the top.

23. The method of claim 14, wherein material constituting the first dielectric layer and the second dielectric layer includes silicon nitride, silicon oxide, zinc-sulfur and titanium oxide.

24. The method of claim 14, wherein the step of forming the optical compensation layer includes depositing germanium (Ge) and a metal selected from a group consisting of aluminum (Al), titanium (Ti), vanadium (V), manganese (Mn), chromium (Cr), zinc (Zn), zirconium (Zr), niobium (Nb), molybdenum (Mo), palladium (Pd), silver (Ag), Cadmium (Cd), hafnium (Hf), tantalum (Ta), tungsten (W), iron (Fe), cobalt (Co), nickel (Ni), ytterbium (Yb), lanthanum (La) or gold (Au).

25. The method of claim 24, wherein the amount of chromium (mole ratio in percentage) that alloys with germanium (Ge) is between 10% to 30% if chromium is used as the metal component of the alloy.

26. The method of claim 14, wherein step of forming the reflection layer includes depositing a metal selected from a group consisting of aluminum (Al), copper (Cu), gold (Au), silver (Ag) or platinum (Pt) or depositing metals selected from the group consisting of the said metallic elements.

27. The method of claim 14, wherein after the step of forming the reflection, further includes forming a passivation layer over the reflection layer.

* * * * *